United States Patent
Kato et al.

(10) Patent No.: US 7,736,425 B2
(45) Date of Patent: *Jun. 15, 2010

(54) INK SET FOR INK-JET RECORDING, INK FOR INK-JET RECORDING AND METHOD FOR FORMING IMAGE

(75) Inventors: Ryuji Kato, Aisai (JP); Tomoyo Hamajima, Nagoya (JP)

(73) Assignee: Brother Kogyo Kabushiki Kaisha (JP)

( * ) Notice: Subject to any disclaimer, the term of this patent is extended or adjusted under 35 U.S.C. 154(b) by 691 days.

This patent is subject to a terminal disclaimer.

(21) Appl. No.: 11/704,301

(22) Filed: Feb. 9, 2007

(65) Prior Publication Data

US 2007/0188574 A1   Aug. 16, 2007

(30) Foreign Application Priority Data

Feb. 16, 2006   (JP)   ............................. 2006-038761

(51) Int. Cl.
*C09D 11/02* (2006.01)
*B41J 2/01* (2006.01)

(52) U.S. Cl. ............... 106/31.27; 106/31.48; 106/31.49; 347/100

(58) Field of Classification Search ............... 106/31.27, 106/31.48, 31.49; 347/100
See application file for complete search history.

(56) References Cited

U.S. PATENT DOCUMENTS

| | | | |
|---|---|---|---|
| 3,336,285 A | 8/1967 | Towne et al. | |
| 3,853,895 A | 12/1974 | Lamm et al. | |
| 3,907,769 A | 9/1975 | Dehnert et al. | |
| 3,950,321 A | 4/1976 | Dehnert et al. | |
| 3,998,802 A | 12/1976 | Dehnert et al. | |
| 4,016,152 A | 4/1977 | Dehnert et al. | |
| 4,042,578 A | 8/1977 | Dehnert et al. | |
| 4,068,085 A | 1/1978 | Ramanathan et al. | |
| 4,128,545 A | 12/1978 | Dehnert et al. | |
| 5,144,015 A | 9/1992 | Chapman | |
| 6,365,720 B1 | 4/2002 | Schacht et al. | |
| 6,444,807 B1 | 9/2002 | Wolleb et al. | |
| 6,495,250 B1 | 12/2002 | Schacht et al. | |
| 6,702,882 B2 | 3/2004 | Yakushigawa et al. | |
| 6,866,380 B2 | 3/2005 | Yakushigawa et al. | |
| 7,244,296 B2 * | 7/2007 | Kato et al. ................ | 106/31.27 |
| 7,244,297 B2 * | 7/2007 | Kato et al. ................ | 106/31.27 |
| 7,303,618 B1 * | 12/2007 | Taga et al. ................ | 106/31.49 |
| 7,425,233 B2 * | 9/2008 | Hamajima et al. ........ | 106/31.49 |
| 2003/0105321 A1 | 6/2003 | Wolleb et al. | |
| 2006/0082629 A1 * | 4/2006 | Kato et al. ................... | 347/100 |
| 2007/0186806 A1 * | 8/2007 | Goto et al. ................ | 106/31.48 |
| 2007/0186807 A1 * | 8/2007 | Goto et al. ................ | 106/31.48 |
| 2007/0188573 A1 * | 8/2007 | Hamajima et al. .......... | 347/100 |
| 2007/0188574 A1 * | 8/2007 | Kato et al. ................... | 347/100 |

FOREIGN PATENT DOCUMENTS

| | | |
|---|---|---|
| JP | 49-74718 | 7/1974 |
| JP | 49-94677 | 9/1974 |
| JP | 51-83631 | 7/1976 |
| JP | 4304270 | 10/1992 |
| JP | 2000-303009 | 10/2000 |
| JP | 526589 | 9/2002 |
| JP | 2003-055585 | 2/2003 |
| JP | 2005-298608 | 10/2005 |

* cited by examiner

*Primary Examiner*—Helene Klemanski
(74) *Attorney, Agent, or Firm*—Banner & Witcoff, Ltd.

(57) ABSTRACT

An ink set for ink-jet recording is provided defined by an evaluation indicator approximately corresponding to an evaluation sensed by human eyes without relying on a color difference ($\Delta E$) or an optical density difference ($\Delta OD$) at the time of evaluating a long-term storage stability of the ink set for ink-jet recording. In the ink set for ink-jet recording which contains a yellow ink, a magenta ink and a cyan ink, values of hue angle change ($\Delta h$), between before and after lightfastness tests, of print regions corresponding to respective inks formed on glossy paper by using the yellow ink, the magenta ink and the cyan ink are not more than about 3° for the yellow ink, not more than about 2° for the magenta ink, and not more than about 6° for the cyan ink.

17 Claims, No Drawings

INK SET FOR INK-JET RECORDING, INK FOR INK-JET RECORDING AND METHOD FOR FORMING IMAGE

CROSS REFERENCE TO RELATED APPLICATION

This application claims the benefit of Japanese Patent Application No. 2006-38761, filed Feb. 16, 2006, which is incorporated herein by reference in its entirety.

BACKGROUND

In recent years, long-term storage stability has become an important property required for an image formed by using an ink-jet recording system.

Widely recognized causes of deteriorating image quality of an ink-jet image in long-term storage include exposure of the image to sunlight and to illuminating lamps or the like. In order to improve the long-term storage stability of the ink-jet image, intensive studies have been made for improving lightfastness of the image. Lightfastness can be evaluated using a color difference ($\Delta E$), and an optical density difference ($\Delta OD$) in an L*a*b* calorimetric system (colorimetric system standardized by Commission Internationale de l'Eclairage (CIE) in 1976, which is defined in JIS Z8729 in the Japanese Industrial Standards (JIS)) between before and after exposure tests to light (see U.S. Pat. Nos. 6,702,882 and 6,866,380).

However, even when the color difference ($\Delta E$) values are the same, the extent of deterioration of ink-jet images appear to be different to human eyes, depending on respective hue ranges of yellow, magenta and cyan. This is because the human eyes are highly sensitive to a change of hue angles. That is, when the hue angles are changed, the human eyes perceive a change of colors. Further, since the optical density difference ($\Delta OD$) is not an indicator of a change of color tones like the hue angle, the sensitivity of the human eyes against the optical density difference ($\Delta OD$) is lower than that against a value of hue angle change ($\Delta h$). Since an ink set for ink-jet recording defined by the color difference ($\Delta E$) or the density difference ($\Delta OD$) does not correspond to an evaluation made by the human eyes, neither satisfactorily shows long-term storage stability and thus long-term storage stability has not been adequately defined.

The optical density (OD value) of each of the three primary colors (yellow, magenta and cyan) and black can be measured. When the optical density (OD value) of a medium color (for example, flesh color) represented by a subtractive color mixing method using the three primary colors is measured, the value obtained does not faithfully reflect the color density of the medium color itself (showing as respective optical densities of colors decomposed to yellow, magenta and cyan, or showing as the optical density of the color changed into mono-color).

SUMMARY

Aspects of the invention provide an ink set for ink-jet recording defined by an evaluation indicator approximately corresponding to an evaluation sensed by human eyes without relying on a color difference ($\Delta E$) or an optical density difference ($\Delta OD$) at the time of evaluating a long-term storage stability of the ink set for ink-jet recording. Further aspects provide respective inks of yellow, magenta and cyan appropriate for the ink set. Other aspects provide a method for forming an image.

DETAILED DESCRIPTION

General Overview

It was discovered that, in place of the color difference ($\Delta E$) or the optical density difference ($\Delta OD$) measurements, the value of hue angle change ($\Delta h$) between before and after lightfastness tests on print region formed on glossy paper can be used to improve lightfastness of an image formed by using ink-jet recording. It was further discovered that deterioration of a color balance caused by temporal fading of colors can be suppressed.

An ink set is provided for ink-jet recording, which contains a yellow ink, a magenta ink and a cyan ink. The values of hue angle change ($\Delta h$), between before and after lightfastness tests, of print regions corresponding to respective inks formed on glossy paper with the yellow ink, the magenta ink and the cyan ink are not more than about 3° for the yellow ink, not more than about 2° for the magenta ink, and not more than about 6° for the cyan ink.

Further aspects of the invention provide the appropriate yellow ink, magenta ink and cyan ink for the ink set for ink-jet recording.

A yellow ink is provided for ink-jet recording, which contains a yellow coloring agent, water, and a water-soluble organic solvent. The yellow coloring agent contains C. I. Direct Yellow 132 or any other suitable yellow dye or combination thereof in an amount of at least about 70 wt % based on the total weight of the yellow coloring agent. The total amount of the yellow coloring agent is, in the range from about 1 wt % to about 4 wt %, based on the total weight of the yellow ink. The value of hue angle change ($\Delta h$), between before and after lightfastness tests, of a print region corresponding to the yellow ink formed on glossy paper is not more than about 3°.

A magenta ink is provided for ink-jet recording, which contains a magenta coloring agent, water and a water-soluble organic solvent. The magenta coloring agent contains any suitable magenta dye or combination of magenta dyes such as a magenta dye represented by the following general formula (1) in an amount, of at least about 70 wt % based on the total weight of the magenta coloring agent:

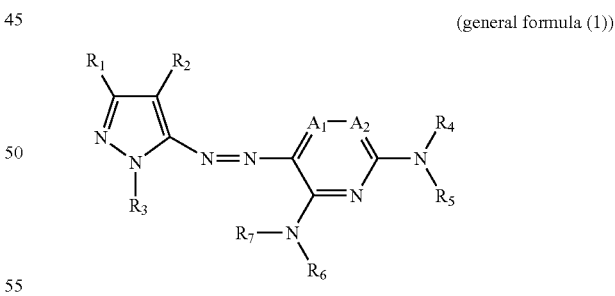

(general formula (1))

in which $R_1$ represents a hydrogen atom, an optionally substituted alkyl group or an optionally substituted aryl group, $R_2$ represents a hydrogen atom, a halogen atom or a cyano group, $R_3$ represents a hydrogen atom, an optionally substituted alkyl group, an optionally substituted aryl group or an optionally substituted heterocyclic group, $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group, where $R_4$ and $R_5$ do not simultaneously represent a hydrogen atom, $R_6$ and $R_7$ do not simultaneously represent a hydrogen atom, and $A_1$ and $A_2$ either simultaneously represent an optionally substituted carbon atom, or differently represent an optionally substituted carbon atom or a nitrogen atom from each other. The total amount of the magenta coloring agent is in the range from about 1 wt % to about 4 wt % based on the total weight of the magenta ink. The value of hue angle change ($\Delta h$), between before and after the lightfastness tests, of a print region corresponding to the magenta ink formed on glossary paper is not more than about 20.

A cyan ink is provided for ink-jet recording, which contains a cyan coloring agent, water and a water-soluble organic solvent. The cyan coloring agent contains any suitable cyan dye or combination of cyan dyes such as a cyan dye represented by the following general formula (2) in an amount of at least about 70 wt % based on the total weight of the cyan coloring agent:

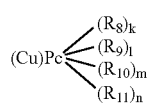
(general formula (2))

in which Pc(Cu) represents a copper phthalocyanine nucleus represented by the following general formula (3):

(general formula (3))

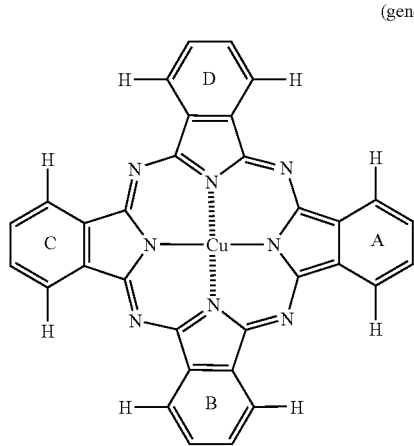

$R_8$, $R_9$, $R_{10}$ and $R_{11}$ each independently represent a substituent selected from $-SO_2-R_a$, $-SO_2NR_bR_c$ and $-CO_2-R_a$, where $R_8$, $R_9$, $R_{10}$ and $R_{11}$ do not simultaneously represent the same substituent, at least one of $R_8$, $R_9$, $R_{10}$ and $R_{11}$ represents a substituent comprising an ionic hydrophilic group, and at least one of $R_8$, $R_9$, $R_{10}$ and $R_{11}$ is present in each of four benzene rings A, B, C and D of a copper phthalocyanine nucleus represented by the general formula (3), $R_a$ represents a substituted or unsubstituted alkyl group, $R_b$ represents a hydrogen atom or a substituted or unsubstituted alkyl group, $R_c$ represents a substituted or unsubstituted alkyl group, k represents a number which satisfies an inequality of $0<k<8$, l represents a number which satisfies an inequality of $0<l<8$, m represents a number which satisfies an inequality of $0 \leqq m<8$, n represents a number which satisfies an inequality of $0 \leqq n<8$, where k, l, m and n each independently represent a number which satisfies an inequality of $4 \leqq k+l+m+n \leqq 8$. The cyan coloring agent is in the range from about 1 wt % to about 5 wt % based on the total weight of the cyan ink. The value of hue angle change ($\Delta h$), between before and after the lightfastness tests, of a print region corresponding to the cyan ink formed on glossary paper is not more than about 6°.

Further aspects of the invention include a method for forming an image by applying an ink on glossy paper using the above-described ink set for ink-jet recording with an ink-jet recording method, wherein, at the time of forming print regions corresponding to respective inks on glossy paper by using the yellow ink, the magenta ink and the cyan ink, values of hue angle change ($\Delta h$), between before and after lightfastness tests, of the print regions are allowed to be not more than about 3° with the yellow ink, not more than about 2° with the magenta ink and not more than about 6° with the cyan ink.

Illustrative Aspects of the Invention

An ink set for ink-jet recording according to aspects of the present invention contains a yellow ink, a magenta ink and a cyan ink. The ink set for ink-jet recording according to aspects of the present invention is configured such that values of hue angle change ($\Delta h$), between before and after lightfastness tests, of print regions corresponding to respective inks formed on the glossy paper by using the yellow ink, the magenta ink and the cyan ink are allowed to be not more than about 3° for the yellow ink, not more than about 2° for the magenta ink, and not more than about 6° for the cyan ink. The values of hue angle change ($\Delta h$) for the inks are adjusted for the reasons described below.

Human eyes have high recognition sensitivity particularly to a flesh color and can recognize even a small change of hue. Magenta is an important color for expressing a color of human skin, and when a value of hue angle change ($\Delta h$) is over about 2°, the change of hue can be recognized with human eyes. Further, yellow is also an important color for expressing the color of human skin. Although a visual recognition property thereof with the human eyes is slightly lower than that of magenta, when the value of hue angle change ($\Delta h$) is over about 3°, the change of hue can be recognized with human eyes. Still further, cyan is an important color for expressing a blue sky, green and the like. Although a visual recognition property thereof with the human eyes is lower than those of magenta and yellow, when the value of hue angle change ($\Delta h$) is over about 6°, the change of hue can be recognized with human eyes.

According to aspects of the invention, yellow is a color in which lightness ($L^*$) is in the range from about 70 to about 100, chroma ($C^*$) is in the range from about 55 to about 90, and hue angle (h) is in the range from about 70° to about 140° in the $L^*a^*b^*$ colorimetric system (standardized by the Commission Internationale de I'Eclairage (CIE) in 1976, which is also defined in JIS Z 8729 of Japanese Industrial Standards (JIS)). A yellow ink is an ink which can exhibit a yellow color by itself. Further, magenta is a color, in a same manner as in the above, in which lightness ($L^*$) is in the range from about 40 to about 70, chroma ($C^*$) is in the range from about 60 to about 100, and hue angle (h) is in the range from about 320° to about 360° or from about 0° to about 100. A magenta ink is an ink which can exhibit a magenta color by itself. Still further, cyan is a color, in a same manner as in the above, in which lightness ($L^*$) is in the range from about 50 to about 85, chroma ($C^*$) is in the range from about 40 to about 80, and hue angle (h) is in the range from about 215° to about 255°. A cyan ink is an ink which can exhibit a cyan color by itself. Even still further, the color of human skin, namely a flesh, color, is a color (color of average Japanese skin) in which lightness ($L^*$) is in the range from about 35 to about 80, chroma ($C^*$) is in the range from about 15 to about 30, and hue angle (h) is in the range from about 10° to about 55° in the L*a*b* colorimetric system.

Perceptive chromaticity indices (a* and b*; hereinafter, referred to a*, and b*, respectively) necessary for obtaining L*, h and C* are measured by using, for example, a spectrophotometer, and then C* and h may be obtained by using the resultant measurements from the equations (1) and (2) described below.

$$C^* = [(a^*)^2 + (b^*)^2]^{1/2} \quad \text{Equation (1):}$$

in the case of $a^* \geq 0$ and $b^* \geq 0$: $h = \tan^{-1}(b^*/a^*)$ in the case of $a^* \geq 0$ and $b^* < 0$: $h = 360 + \tan^{-1}(b^*/a^*)$ in the case of $a^* < 0$: $h = 180 + \tan^{-1}(b^*/a^*)$     Equations (2):

According to aspects of the invention, glossy paper refers to a base paper having a coated layer for surface smoothness. Specific examples thereof include, but are not limited to, photographic glossy paper BP60GLA (manufactured by Brother Industries, Ltd.); ink-jet printer paper "ultra-glossy paper for extremely fine photo output" (manufactured by Kokuyo Co., Ltd.); PhotolikeQP <Photo Jet Paper> series, thick glossy paper (manufactured by Konica Minolta Holdings, Inc.); KASSAI® series, photo finish Pro, photo finish Advance, and Fuji Film high-quality glossy paper (manufactured by Fuji Photo Film Co., Ltd.); and the like.

According to aspects of the invention, the lightfastness test refers to a test to be executed under the condition that light radiated from a xenon lamp is irradiated for 100 hours at a room temperature of 25° C., a humidity of 50% RH with an irradiation intensity of 93 klux. Examples of lightfastness testing machines to be employed for the test include a high-energy xenon weather-meter SC750-WN (manufactured by Suga Test Instruments Co., Ltd.).

The yellow ink for use in the ink set for ink-jet recording according to aspects of the invention contains a yellow coloring agent, water and a water-soluble organic solvent. The yellow coloring agent contains a dye excellent in lightfastness, such as, C. I. Direct Yellow 132. The yellow ink containing this dye shows a small value of hue angle change (Δh) between before and after the lightfastness tests. The yellow coloring agent may further contain other dyes such as C. I. Direct Yellow 142 and the like.

When the amount of C. I. Direct Yellow 132 in the yellow coloring agent is unduly low, lightfastness is deteriorated. A suitable amount of C.I. Direct Yellow 132 is at least about 70 wt % based on the total weight of the yellow coloring agent, and may be at least about 80 wt % based on the total weight of the yellow coloring agent.

Further, the total amount of the yellow coloring agent is determined depending on ink performances and required characteristics. When the amount of coloring agent is unduly small, a color reproduction range becomes narrow, while when the amount is unduly large, there is a fear of generating an ejection failure caused by precipitation of a component due to moisture evaporation. A suitable range of yellow coloring agent is from about 1 wt % to about 4 wt % based on the total weight of the yellow ink.

The magenta ink for use in the ink set for ink-jet recording according to aspects of the invention contains a magenta coloring agent, water and a water-soluble organic solvent. The magenta coloring agent contains a dye excellent in lightfastness, such as a magenta dye represented by the above-described general formula (1). The magenta ink containing this dye shows a small value of hue angle change (Δh) between before and after the lightfastness tests. The magenta coloring agent may further contain other dyes such as C. I. Acid Red 52 and the like.

When the amount of the magenta dye represented by the general formula (1) in the magenta coloring agent is unduly low, lightfastness is deteriorated. A suitable amount of the magenta coloring dye is at least about 70 wt % based on the total weight of the magenta coloring agent, and may be at least about 80 wt % based on the total weight of the magenta coloring agent.

The total amount of the magenta coloring agent is determined depending on ink performances and required characteristics. When the total amount of magenta coloring agent is unduly small, a color reproduction range becomes narrow, while when the total amount is unduly large, there is a fear of generating an ejection failure caused by precipitation of a component due to moisture evaporation. A suitable range of magenta coloring agent is from about 1 wt % to about 4 wt % based on the total weight of the magenta ink.

The cyan ink for use in the ink set for ink-jet recording according to aspects of the invention contains a cyan coloring agent, water and a water-soluble organic solvent. The cyan coloring agent contains a dye excellent in lightfastness, such as a cyan dye represented by the above-described general formula (2). The cyan ink containing this dye shows a small value of hue angle change (Δh) between before and after the lightfastness tests. The cyan coloring agent may further contain other dyes such as C. I. Direct Blue 199 and the like.

When the amount of the cyan dye represented by the general formula (2) in the cyan coloring agent is unduly low, lightfastness is deteriorated. A suitable amount of the cyan coloring dye is at least about 70 wt % based on the total weight of the cyan coloring dye, and may be at least about 80 wt % based on the total weight of the cyan coloring dye.

The total amount of the cyan coloring agent is determined depending on ink performances and required characteristics. When the total amount of the cyan coloring agent is unduly small, a color reproduction range becomes narrow, while when the total amount is unduly large, there is a fear of generating an ejection failure caused by precipitation of a component due to moisture evaporation. A suitable range of the cyan coloring agent is from about 1 wt % to about 5 wt % based on the total weight of the cyan ink.

Providing the ink set for ink-jet recording with black ink will reduce costs of black text print. Any suitable pigment type or dye type black ink may be used in the ink set for ink-jet recording.

Next, substituents $R_1$ to $R_7$, and $A_1$ and $A_2$ in the magenta dyes represented by the general formula (1) will be described.

$R_1$ represents a hydrogen atom, an optionally substituted alkyl group or an optionally substituted aryl group. $R_2$ represents a hydrogen atom, a halogen atom or a cyano group. $R_3$ represents a hydrogen atom, an optionally substituted alkyl group, an optionally substituted aryl group or an optionally substituted heterocyclic group. $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group. However, $R_4$ and $R_5$ do not simultaneously represent a hydrogen atom, $R_6$ and $R_7$ do not simultaneously represent a hydrogen atom. $A_1$ and $A_2$ either simultaneously represent an optionally substituted carbon atom, or differently represent an optionally substituted carbon atom or a nitrogen atom from each other.

Suitable halogen atoms include a fluorine atom, a chlorine atom, a bromine atom and the like.

Suitable alkyl groups may have from 1 to 6 carbon atoms. Examples of substituents include, but are not limited to, a hydroxyl group, alkoxy groups (a methoxy group, an ethoxy group and the like), a cyano group, halogen atoms (a fluorine atom, a chlorine atom, a bromine atom and the like), and ionic hydrophilic groups (a carboxylate group, sulfonate group and the like). Specific examples of suitable alkyl groups include, but are not limited to, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group and the like.

Suitable aryl groups may have from 6 to 12 carbon atoms excluding those in the substituent. Examples of substituents include, but are not limited to, alkyl groups (a methyl group, an ethyl group, an isopropyl group, a tert-butyl group, an n-octyl group and the like), alkoxy groups (refer to above-described examples), halogen atoms (refer to above-described examples), alkylamino groups (a methylamino group, a dimethylamino group and the like), an amido group, a carbamoyl group, a sulfamoyl group, a sulfoamido group, a hydroxyl group, ester groups (a methoxycarbonyl group, an ethoxycarbonyl group and the like), and ionic hydrophilic groups (refer to the above-described examples). Specific examples of substitutable aryl groups include, but are not limited to, a phenyl group, a naphthyl group, a p-tolyl group, a p-octylphenyl group, a mesityl group, a p-methoxyphenyl group, an o-chlorophenyl group, a m-(3-sulfopropylamino) phenyl group and the like.

Suitable heterocyclic groups include 5-ring or 6-ring heterocyclic groups. Examples of substituents include, but are not limited to, an amido group, a carbamoyl group, a sulfamoyl group, a sulfoamido group, a hydroxyl group, ester groups (refer to the above-described examples), ionic hydrophilic groups (refer to the above-described examples), and the like. Specific examples of heterocyclic groups include, but are not limited to, a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group and the like.

Suitable substituents for the sulfonyl groups include alkyl groups (refer to the above-described examples), aryl groups (refer to the above-described examples) and the like. Specific examples of substitutable sulfonyl groups include, but are not limited to, a methylsulfonyl group, a phenylsulfonyl group and the like.

Suitable acyl groups have from 1 to 12 carbon atoms excluding those in the substituent. Examples of substituents include, but are not limited to, ionic hydrophilic groups (refer to the above-described examples). Specific examples of the substitutable acyl groups include, but are not limited to, an acetyl group, a benzoyl group, a chloroacetyl group and the like.

As already described, $A_1$ and $A_2$ in the general formula (1) either simultaneously represent an optionally substituted carbon atom or differently represent an optionally substituted carbon atom or a nitrogen atom. When $A_1$ and $A_2$ simultaneously represent an optionally substituted carbon atom, an excellent performance is obtained. Suitable substituents which each combine with any one carbon atom of $A_1$ and $A_2$, include alkyl groups having from 1 to 3 carbon atoms, a carboxyl group, a carbamoyl group, a cyano group and the like.

Further, in the general formula (1), $R_4$ and $R_5$ do not simultaneously represent a hydrogen atom, and also, $R_6$ and $R_7$ do not simultaneously represent a hydrogen atom. Still further, when the number of substituents of the sulfonic acid group or carboxyl group is increased, water-solubility of the dye (1) tends to be improved, and therefore, the number of substituents may be adjusted as need arises.

In one aspect, the magenta dye is represented by general formula (1), wherein $R_1$ represents an alkyl group, $R_2$ represents a cyano group, $R_3$ represents a hydrogen atom or an optionally substituted heterocyclic group, $R_4$ represents a hydrogen atom, an optionally substituted heterocyclic group or a substituted aryl group, $R_5$ and $R_6$ each independently represent a substituted heterocyclic group or a substituted aryl group, $R_7$ represents a hydrogen atom, $A_1$ represents a substituted carbon atom and $A_2$ represents an optionally substituted carbon atom.

In another aspect, the magenta dye is represented by general formula (1), wherein $R_1$ represents a tert-butyl group, $R_2$ represents a cyano group, $R_3$ represents a hydrogen atom or a benzothiazolyl group (for example, benzothiazol-2-yl group) which may be substituted with a sulfonic acid group or an alkali metal salt thereof, $R_4$ represents a hydrogen atom or a benzothiazolyl group (for example, benzothiazol-2-yl group) which may be substituted with a sulfonic acid group or an alkali metal salt thereof or an alkyl phenyl group (for example, a mesityl group) substituted with a sulfonic acid group or an alkali metal salt group, $R_5$ and $R_6$ each independently represent a mono-alkyl phenyl group or tri-alkyl phenyl group (for example, p-octylphenyl group or mesityl group) which may be substituted with a sulfonic acid group or an alkali metal salt thereof or a benzothiazolyl group (for example, benzothiazol-2-yl group) which is substituted with a sulfonic acid group or an alkali metal salt thereof, $R_7$ represents a hydrogen atom, $A_1$ represents a carbon atom substituted with an alkyl group (for example, a methyl group), and $A_2$ represents a carbon atom which may be substituted with a cyano group.

Specific examples of magenta dyes represented by the general formula (1) include compounds represented by the following chemical formulae (1-A) to (1-E) as described below.

Chemical formula (1-A):

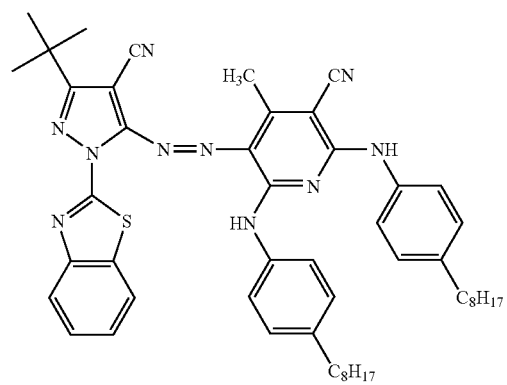

Chemical formula (1-A) is an embodiment of general formula (1) wherein $R_1$ represents a tert-butyl group, $R_2$ represents a cyano group, $R_3$ represents a benzothiazol-2-yl group, $R_4$ represents a hydrogen atom, $R_5$ and $R_6$ each represent a p-octylphenyl group, $R_7$ represents a hydrogen atom, $A_1$ represents a carbon atom substituted with a methyl group, and $A_2$ represents a carbon atom substituted with a cyano group.

Chemical formula (1-B):

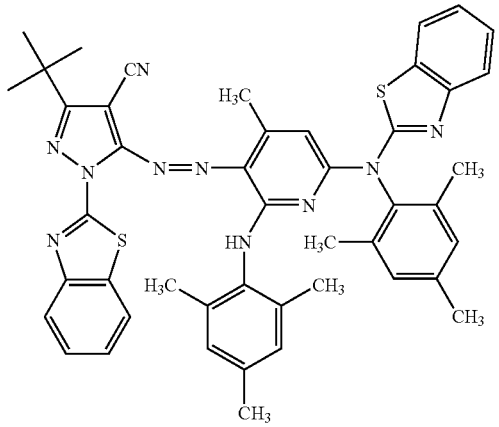

Chemical formula (1-B) is an embodiment of general formula (1) wherein $R_1$ represents a tert-butyl group, $R_2$ represents a cyano group, $R_3$ and $R_4$ each represent a benzothiazol-2-yl group, $R_5$ and $R_6$ each represent a mesityl group, $R_7$ represents a hydrogen atom, $A_1$ represents a carbon atom substituted with a methyl group, and $A_2$ represents a carbon atom.

Chemical formula (1-C):

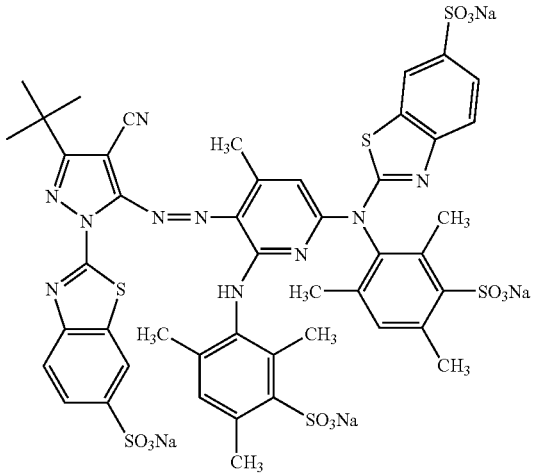

Chemical formula (1-C) is an embodiment of general formula (1), wherein $R_1$ represents a tert-butyl group, $R_2$ represents a cyano group, $R_3$ and $R_4$ each represent a 6-sulfosodium salt-benzothiazol-2-yl group, $R_5$ and $R_6$ each represent a 3-sulfosodium salt-mesityl group, $R_7$ represents a hydrogen atom, $A_1$ represents a carbon atom substituted with a methyl group, and $A_2$ represents a carbon atom.

Chemical formula (1-D):

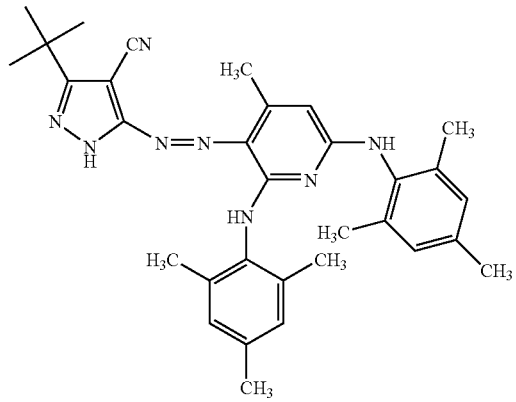

Chemical formula (1-D) is an embodiment of general formula (1), wherein $R_1$ represents a tert-butyl group, $R_2$ represents a cyano group, $R_3$ and $R_4$ each represent a hydrogen atom, $R_5$ and $R_6$ each represent a mesityl group, $R_7$ represents a hydrogen atom, $A_1$ represents a carbon atom substituted with a methyl group, and $A_2$ represents a carbon atom.

Chemical formula (1-E):

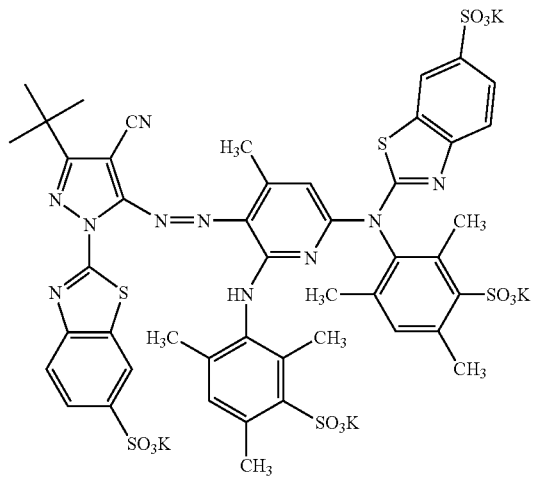

Chemical formula (1-E) is an embodiment of general formula (1) wherein $R_1$ represents a tert-butyl group, $R_2$ represents a cyano group, $R_3$ and $R_4$ each represent a 6-sulfopotassium salt-benzothiazol-2-yl group, $R_5$ and $R_6$ each represent a 3-sulfopotassium salt-mesityl group, $R_7$ represents a hydrogen atom, $A_1$ represents a carbon atom substituted with a methyl group, and $A_2$ represents a carbon atom.

Next, substituents $R_8$, $R_9$, $R_{10}$ and $R_{11}$, Pc(Cu), as well as k, l, m and n in the cyan dyes represented by general formula (2) are described in detail.

As described above, Pc(Cu) represents a copper phthalocyanine nucleus represented by general formula (3). $R_8$, $R_9$, $R_{10}$ and $R_{11}$ each independently represent a substituent selected from among $-SO_2-R_a$, $-SO_2NR_bR_c$ and $-CO_2-R_a$, where $R_8$, $R_9$, $R_{10}$ and $R_{11}$ do not simultaneously represent the same substituent. However, at least one of $R_8$, $R_9$, $R_{10}$ and $R_{11}$ contains an ionic hydrophilic group as a substituent. At least one of $R_8$, $R_9$, $R_{10}$ and $R_{11}$ is present in each of four benzene rings A, B, C and D of the copper phthalocyanine nucleus represented by the general formula (3). $R_a$ represents a substituted or unsubstituted alkyl group; $R_b$ represents a hydrogen atom, or a substituted or unsubstituted alkyl group; and $R_c$ represents a substituted or unsubstituted alkyl group. k represents a number which satisfies an inequality of 0<k<8; l represents a number which satisfies an inequality of 0<l<8; m represents a number which satisfies an inequality of 0≦m<8; and n represents a number which satisfies an inequality of 0≦n<8, where k, l, m and n each independently represent a number which satisfies an inequality of 4≦k+l+m+n≦8.

In the general formula (2), substituted or unsubstituted alkyl groups of $R_a$, $R_b$ or $R_c$ include straight-chain alkyl groups, branched-chain alkyl groups and alicyclic alkyl groups each having from 1 to 12 carbon atoms. Branched-chain alkyl groups are suitable for enhancing solubility of the dye and stability of the ink, such as groups having asymmetric carbon (used in racemic form).

Examples of substituents in the substituted alkyl groups represented by $R_a$, $R_b$ or $R_c$ include, but are not limited to, straight-chain or branched-chain alkyl groups each having from 1 to 12 carbon atoms, straight-chain or branched-chain aralkyl groups each having from 7 to 18 carbon atoms, straight-chain or branched-chain alkenyl groups each having from 2 to 12 carbon atoms, straight-chain or branched-chain alkynyl groups each having from 2 to 12 carbon atoms, straight-chain or branched-chain cycloalkyl groups each having from 3 to 12 carbon atoms, and straight-chain or branched-chain cycloalkenyl groups each having from 3 to 12 carbon atoms (though, in the foregoing groups, those having a branched chain are suitable for enhancing the solubility of the dye and stability of the ink, such as those having an asymmetric carbon, such as a methyl group, an ethyl group, a propyl group, an isopropyl group, a sec-butyl group, a tert-butyl group, a 2-ethylhexyl group, a 2-methylsulfonylethyl group, a 3-phenoxypropyl group, a trifluoromethyl group, and a cyclopentyl group), halogen atoms (for example, a chlorine atom and a bromine atom), aryl groups (for example, a phenyl group, a 4-tert-butylphenyl group and a 2,4-di-tert-amylphenyl group), heterocyclic groups (for example, an imidazolyl group, a pyrazolyl group, a triazolyl group, a 2-furyl group, a 2-thienyl group, a 2-pyrimidinyl group and a 2-benzothiazolyl group), a cyano group, a hydroxyl group, a nitro group, a carboxy group, an amino group, alkyloxy groups (for example, a methoxy group, an ethoxy group, a 2-methoxyethoxy group and a 2-methanesulfonylethoxy group), aryloxy groups (for example, a phenoxy group, a 2-methylphenoxy group, a 4-tert-butylphenoxy group, a 3-nitrophenoxy group, a 3-tert-butyloxycarbamoylphenoxy group and a 3-methoxycarbamoyl group), acylamino groups (for example, an acetamido group, a benzamido group and a 4-(3-tert-butyl-4-hydroxyphenoxy)butanamido group), alkylamino groups (for example, a methylamino group, a butylamino group, a diethylamino group and a methylbutylamino group), anilino groups (for example, a phenylamino group and a 2-chloroanilino group), ureido groups (for example, a phenylureido group, a methylureido group and an N,N-dibutylureido group), sulfamoylamino groups (for example, an N,N-dipropylsulfamoylamino group), alkylthio groups (for example, a methylthio group, an octylthio group and a 2-phenoxyethylthio group), arylthio groups (for example, a phenylthio group, a 2-butoxy-5-tert-octylphenylthio group and a 2-carboxyphenylthio group), alkyloxycarbonylamino groups (for example, a methoxycarbonylamino group), sulfonamido groups (for example, a methanesulfonamido group, a benzenesulfonamido group and a p-toluenesulfonamido group), carbamoyl groups (for example, an N-ethylcarbamoyl group and an N,N-dibutylcarbamoyl group), sulfamoyl groups (for example, an N-ethylsulfamoyl group, an N,N-dipropylsulfamoyl group, and an N-phenylsulfamoyl group), sulfonyl groups (for example, a methanesulfonyl group, an octanesulfonyl group, a benzenesulfonyl group and a toluenesulfonyl group), alkyloxycarbonyl groups (for example, a methoxycarbonyl group and a butyloxycarbonyl group), heterocyclic oxy groups (for example, a 1-phenyltetrazol-5-oxy group and a 2-tetrahydropyranyloxy group), azo groups (for example, a phenylazo group, a 4-methoxyphenylazo group, a 4-pivaloylaminophenylazo group and a 2-hydroxy-4-propanoylphenylazo group), acyloxy groups (for example, an acetoxy group), carbamoyloxy groups (for example, an N-methylcarbamoyloxy group and an N-phenylcarbamoyloxy group), silyloxy groups (for example, a trimethylsilyloxy group and a dibutylmethylsilyloxy group), aryloxycarbonylamino groups (for example, a phenoxycarbonylamino group), imido groups (for example, an N-succinimido group and an N-phthalimido group), heterocyclic thio groups (for example, a 2-benzothiazolylthio group, a 2,4-di-phenoxy-1,3,5-triazole-6-thio group and a 2-pyridylthio group), sulfinyl groups (for example, a 3-phenoxypropylsulfinyl group), phosphonyl groups (for example, a phenoxyphosphonyl group, an octyloxyphosphonyl group and a phenylphosphonyl group), aryloxycarbonyl groups (for example, a phenoxycarbonyl group), acyl groups (for example, an acetyl group, a 3-phenylpropanoyl group and a benzoyl group), and ionic hydrophilic groups (for example, a carboxyl group, a sulfo group, a phosphono group and a quaternary ammonium group). Among these substituents, a hydroxyl group, a group having an ether bond or ester bond, a cyano group and a sulfonamido group enhance an associating property and fastness of dyes. In addition to the above, the substituent of the substituted alkyl groups $R_a$, $R_b$ and $R_c$ may have a halogen atom or an ionic hydrophilic group.

Specific examples of substituted or unsubstituted alkyl groups represented by $R_a$, $R_b$ or $R_c$ include, but are not limited to, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group and the like.

In one aspect, the cyan dye is represented by general formula (2), wherein $R_8$, $R_9$, $R_{10}$ and $R_{11}$ are substituents represented by —$SO_2$—$R_a$, wherein $R_a$ is a substituted or unsubstituted alkyl group, provided that not all of the four substituted or unsubstituted alkyl groups $R_a$ in $R_8$, $R_9$, $R_{10}$ and $R_{11}$ are identical. Here, "not all of the four groups $R_a$ being identical" means that, provided that at least one of the four groups $R_a$ is a substituted alkyl group having an ionic hydrophilic group, at least two types of $R_a$ are present.

In one aspect, the cyan dye is represented by general formula (2) wherein k is the number which satisfies an inequality of 0<k<4; l is the number which satisfies an inequality of 0<l<4; m is the number which satisfies an inequality of 0≦m<4; and n is the number which satisfies an inequality of 0≦n<4, where k, l, m and n are numbers which each satisfy an equation of k+l+m+n=4.

Specific examples of the cyan dyes represented by the general formula (2) include compounds represented by the chemical formulae (2-A) to (2-E) as described below.

Chemical formula (2-A):

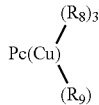

$R_8 = -SO_2(CH_2)_3SO_3Li$

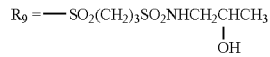

Chemical formula (2-A) is an embodiment of general formula (2) wherein $R_8$ represents a lithium-sulfonatopropylsulfonyl group; $R_9$ represents an N-(2-hydroxypropyl)sulfamoylpropylsulfonyl group; k represents 3; l represents 1; and m and n each represent 0.

Chemical formula (2-B):

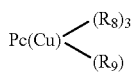

$R_8 = -SO_2(CH_2)_3SO_3Li$

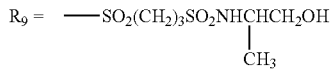

Chemical formula (2-B) is an embodiment of general formula (2) wherein $R_8$ represents a lithium-sulfonatopropylsulfonyl group; $R_9$ represents an N-(2-hydroxyisopropyl)sulfamoylpropylsulfonyl group; k represents 3; l represents 1; and m and n each represent 0.

Chemical formula (2-C):

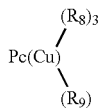

$R_8 = -SO_2(CH_2)_3SO_3Li$

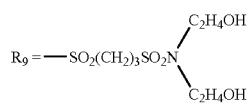

Chemical formula (2-C) is an embodiment of general formula (2) wherein $R_8$ represents a lithium-sulfonatopropylsulfonyl group; $R_9$ represents an N,N-(di(2-hydroxyethyl)sulfamoylpropylsulfonyl group; k represents 3; l represents 1; and m and n each represent 0.

Chemical formula (2-D):

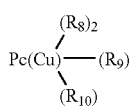

$R_8 = -SO_2(CH_2)_3SO_3Li$ $R_9 = -SO_2(CH_2)_3SO_2NHCH_2CHCH_3$
$\qquad\qquad\qquad\qquad\quad |$
$\qquad\qquad\qquad\qquad\ OH$ $R_{10} = -SO_2(CH_2)_3SO_2NHCHCH_2OH$
$\qquad\qquad\qquad\qquad\qquad |$
$\qquad\qquad\qquad\qquad\ \ CH_3$ Chemical formula (2-D) is an embodiment of general formula (2) wherein $R_8$ represents a lithium-sulfonatopropylsulfonyl group; $R_9$ represents an N-(2-hydroxypropyl)sulfamoylpropylsulfonyl group; $R_{10}$ represents an N-(2-hydroxyisopropyl)sulfamoylpropylsulfonyl group; k represents 2; l represents 1; m represents 1; and n represents 0.

Chemical formula (2-E):

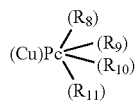

$R_8 = -SO_2(CH_2)_3SO_3Li$ $R_9 = -SO_2(CH_2)_3CO_2Li$ $R_{10} = -SO_2(CH_2)_3SO_2NHCH_2CHCH_3$
$\qquad\qquad\qquad\qquad\quad |$
$\qquad\qquad\qquad\qquad\ OH$ $R_{11} = -SO_2(CH_2)_3SO_2NHCHCH_2OH$
$\qquad\qquad\qquad\qquad\qquad |$
$\qquad\qquad\qquad\qquad\ \ CH_3$ Chemical formula (2-E) is an embodiment of general formula (2) wherein $R_8$ represents a lithium-sulfonatopropylsulfonyl group; $R_9$ represents a lithium-carboxylatopropylsulfonyl group; $R_{10}$ represents an N-(2-hydroxypropyl)sulfamoylpropylsulfonyl group; $R_{11}$ represents an N-(2-hydroxyisopropyl)sulfamoylpropylsulfonyl group; k, l, m, and n each represent 1.

In accordance with aspects of the invention, water and water-soluble organic solvents are contained in each ink for an ink set for ink-jet recording.

Deionized water is suitable. The amount of water is selected in a wide range depending on a type or composition of a water-soluble organic solvent to be simultaneously used or desired characteristics of the ink. When the amount of water is unduly small, a viscosity of the ink is increased, and then it may become difficult to eject the ink from an ink-jet head, while when the amount is unduly large, a coloring agent tends to be deposited by moisture evaporation, and then the nozzle becomes easily clogged. The amount of water is usually in the range from about 10 wt % to about 95 wt % based on the total weight of the ink, and often from about 10 wt % to about 80 wt % based on the total weight of the ink.

Water-soluble organic solvents to be used in each ink of the water-based ink set for ink-jet recording are principally classified into humectants and penetrants. The water-soluble organic solvent to be used as a humectant is added to the ink for the purpose of preventing clogging of the nozzle of the ink-jet head, while the water-soluble organic solvent to be used as a penetrating agent is added to the ink for the purpose of allowing the ink to quickly penetrate into the inside of the objective recording material when print is made.

Specific examples of humectants include, but are not limited to, water-soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like. When an amount of the water-soluble organic solvent as the humectant is unduly small, it is insufficient to prevent the nozzle of the ink-jet head from being clogged, while when the amount is unduly large, the viscosity of the ink is increased, and then it becomes difficult to smoothly eject the ink from the nozzle. The amount of water-soluble organic solvent is usually in the range from about 5 wt % to about 50 wt % based on total weight of the ink, and often from about 10 wt % to about 40 wt % based on the total weight of the ink.

Specific examples of suitable penetrants include glycol ethers exemplified by alkyl ethers of ethylene glycol type and propylene glycol type. Specific examples of the alkyl ethers of ethylene glycol type include, but are not limited to, ethylene glycol methyl ether, ethylene glycol ethyl ether, ethylene glycol n-propyl ether, ethylene glycol n-butyl ether, ethylene glycol isobutyl ether, diethylene glycol methyl ether, diethylene glycol ethyl ether, diethylene glycol n-propyl ether, diethylene glycol n-butyl ether, diethylene glycol isobutyl ether, triethylene glycol methyl ether, triethylene glycol ethyl ether, triethylene glycol n-propyl ether, triethylene glycol n-butyl ether, triethylene glycol isobutyl ether and the like. Specific examples of alkyl ethers of propylene glycol type include, but are not limited to, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, tripropylene glycol n-butyl ether and the like. When an amount of the penetrant is unduly small, penetrability becomes insufficient, while when the amount is unduly large, the penetrability becomes superfluous, and then blurring such as feathering and the like tends to occur. The amount of penetrant is usually in the range from about 0.1 wt % to about 10 wt % based on total weight of the ink, and often from about 0.5 wt % to about 7 wt % based on the total weight of the ink.

Besides the humectant and the penetrant, for other purposes such as preventing the ink from being dried at a tip end portion of the ink-jet head, enhancing density of print, and realizing bright color development than the purposes described above, other water-soluble organic solvents than those described above may also be added thereto. Specific examples of these water-soluble organic solvents include lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones or keto-alcohols such as acetone, diacetone alcohol and the like; ethers such as tetrahydrofuran, dioxane and the like; glycerin; pyrrolidones such as 2-pyrrolidone, N-methyl-2-pyrrolidone and the like; 1,3-dimethyl-2-imidazolidinone; and the like.

Although a basic composition of each of the yellow ink, the magenta ink and the cyan ink configuring the water-based ink set for ink-jet recording according to aspect of the invention is as described below, known additives in related art such as a surfactant; a viscosity modifier such as polyvinyl alcohol, cellulose and the like; a surface tension modifier; a mildew proofing agent; a rust preventing agent may be added, as need arises.

The ink of each color is prepared by uniformly mixing a coloring agent, water and a water-soluble organic solvent, and optionally various types of other additives of each color of yellow, magenta and cyan in accordance with a suitable method. And then the ink set for ink-jet recording according to aspects of the invention can be produced by appropriately combining the thus-prepared inks of different colors. Further, any one of other dyes and pigments than those described above may be employed in the ink of each color within a range in which the aspects of the invention is not impaired. For example, a direct dye, an acid dye, a basic dye, and a reactive dye may be used. Further, when the dyes are classified in accordance with the structure thereof, an azo dye, a metal complex dye, a naphthol dye, an anthraquinone dye, an indigo dye, a carbonium dye, a quinoneimine dye, a xanthene dye, an aniline dye, a quinoline dye, a nitro dye, a nitroso dye, a benzoquinone dye, a naphthoquinone dye, a phthalocyanine dye, a metal phthalocyanine dye or the like may be used thereto.

Illustrative embodiments of the yellow ink, the magenta ink and the cyan ink appropriate for the ink set for ink-jet recording according to aspects of the invention will be illustrated below. These inks of respective colors are also within the scope of the invention. Components of these inks are equivalent to those described in the ink set for ink-jet recording according to aspects of the invention.

(Yellow Ink)

An illustrative yellow ink for ink-jet recording contains a yellow coloring agent, water and a water-soluble organic solvent. The yellow coloring agent may contain C. I. Direct Yellow 132 in an amount of at least about 70 wt % based on total weight of the yellow coloring agent. The total amount of the yellow coloring agent is in the range from about 1 wt % to about 4 wt % based on total weight of the yellow ink. The value of hue angle change ($\Delta h$), between before and after lightfastness tests, of the print region corresponding to the yellow ink formed on glossy paper is not more than about 3°.

(Magenta Ink)

An illustrative magenta ink for ink-jet recording contains a magenta coloring agent, water and a water-soluble organic solvent. The magenta coloring agent may contain a magenta dye represented by the general formula (1) in an amount of at least about 70 wt % based on the total weight of the magenta coloring agent The total amount of the magenta coloring agent is in the range from about 1 wt % to about 4 wt % based on the total weight of the magenta ink. The value of hue angle change ($\Delta h$), between before and after lightfastness tests, of the print region formed on glossy paper corresponding to the magenta ink is not more than about 2°.

(Cyan Ink)

An illustrative cyan ink for ink-jet recording contains a cyan coloring agent, water and a water-soluble organic solvent. The cyan coloring agent may contain a cyan dye represented by the general formula (2) in an amount of at least about 70 wt % based on the total weight of the cyan coloring agent. The total amount of the cyan coloring agent is in the range from about 1 wt % to about 5 wt % based on the total weight of the cyan ink. The value of hue angle change ($\Delta h$), between before and after lightfastness tests, of the print region formed on glossy paper corresponding to the cyan ink is not more than about 6°.

Aspects of the invention include a method for forming an image by applying ink droplets on glossy paper by an ink-jet recording system. When forming print regions corresponding to respective inks on glossy paper by using the yellow ink, the magenta ink and the cyan ink, the values of hue angle change ($\Delta h$), between before and after the lightfastness tests, of the print regions are not more than about 3° for yellow ink, not more than about 2° for magenta ink and not more than about 6° for cyan ink. According to this image forming method, an image with a natural tone and an image with a flesh color which each have a small change between before and after the lightfastness tests, even when observed with human eyes, each show that excellent long-term storage stability may be formed on glossy paper. The value of hue angle change ($\Delta h$), between before and after the lightfastness tests, of print region in flesh color is typically not more than about 10° when the print region in flesh color is formed on glossy paper by using the yellow ink, the magenta ink and the cyan ink.

Further, in the image forming method, the ink is generally applied on the glossary paper such that the total amount of the ink applied is in the range from about 1 μg/in² to about 30 μg/in² in terms of 100% duty. When the total amount of the ink applied is less than the above-described range, there is insufficient color development, whereas when the amount is more than the above-described range, there are problems fixing the ink. The term "duty" used herein means a ratio of actual print area against print region area of recording medium, namely, a ratio of the number of actual print dots against the number of total dots filling the print region; therefore, 100% duty means the maximum amount of the ink applied to the print region.

Examples 1 to 7 and Comparative Examples 1 TO 4

Hereinafter, the present invention will be described in detail with reference to embodiments of the ink set for ink-jet recording according to aspects of the invention; however, these embodiments are illustrative and should not be interpreted as limiting the invention in any way.

1) Preparation of Ink

<Yellow Inks Y-1 to Y-7>

By uniformly mixing ink components shown in Table 1, yellow inks Y-1 to Y-7 for ink-jet recording were prepared. The yellow inks Y-1 to Y-6 are yellow inks according to aspects of the invention, and the yellow ink Y-7 is a yellow ink in the Comparative Example.

<Magenta Inks M-1 to M-7>

By uniformly mixing ink components shown in Table 2, magenta inks M-1 to M-7 for ink-jet recording were prepared. Further, dyes (1-A) to (1-E) correspond to compounds represented by the chemical formulae (1-A) to (1-E), respectively. The magenta inks M-1 to M-6 are magenta inks according to aspects of the invention, and the magenta ink M-7 is a magenta ink in the Comparative Example.

<Cyan Inks C-1 to C-7>

By uniformly mixing ink components shown in Table 3, cyan inks C-1 to C-7 for ink-jet recording were prepared. Further, dyes (2-A) to (2-E) correspond to compounds represented by the chemical formulae (2-A) to (2-E), respectively. The cyan inks C-1 to C-6 are cyan inks according to aspects, of the invention, and the cyan ink C-7 is a cyan ink in the Comparative Example.

2) Evaluation of Ink

Inks for ink-jet recording were filled in desired ink cartridges, and then the resultant ink cartridges were attached to a digital multifunction device equipped with an ink-jet printer DCP-110C (available from Brother Industries, Ltd.). Subsequently, the resultant digital multifunction device printed monotone gradation samples of the yellow color, the magenta color and the cyan color on glossy paper. The glossy paper employed was KASSAI® Fuji Film glossy paper of high quality (available from Fuji Photo Film Co., Ltd.).

The thus-obtained monotone gradation sample of each color was subjected to lightfastness test. The lightfastness test was performed by using a high-energy xenon weather-meter SC750-WN (manufactured by Suga Test Instruments Co., Ltd.) such that light radiated from a xenon lamp is irradiated on each gradation sample for 100 hours at a room temperature of 25° C., a humidity of 50% RH with an irradiation intensity of 93 klux. Hereinafter, lightfastness evaluations on the yellow ink, the magenta ink and the cyan ink are described in detail.

(a) Visual Evaluation

The gradation sample subjected to the lightfastness test was visually evaluated in accordance with evaluation criteria described below as to whether each color of yellow, magenta and cyan is sufficiently expressed. The obtained evaluation results are shown in Tables 1 to 3.

A: each color is sufficiently expressed.

C: expression of each color is insufficient.

(b) Evaluation of Value of Hue Angle Change (Δh)

In regard to patches each having an OD value of 1.0 before the lightfastness test among the gradation samples of colors of yellow, magenta and cyan, the hue angle ($h_b$) before the lightfastness test and the hue angle ($h_a$) after the lightfastness test were measured. Firstly, L*, a* and b* were measured by using Spectrolino (manufactured by Gretag Macbeth; light source: $D_{65}$; field of view: 2°; status: A), and then the hue angle (h) was computed from these measurements in accordance with the equation (2). Thereafter, in accordance with the equation (3) to be described below, values of hue angle change ($\Delta h_y$, $\Delta h_m$ and $\Delta h_c$), between before and after the tests, of the patches each having an OD value of 1.0 were obtained and the resultant measurements were evaluated in accordance with evaluation criteria described below. The obtained results are shown in Tables 1 to 3. On this occasion, $\Delta h_y$ expresses a value of hue angle change of yellow; $\Delta h_m$ expresses a value of hue angle change of magenta; and $\Delta h_c$ expresses a value of hue angle change of cyan.

Value of hue angle change ($\Delta h_y$, $\Delta h_m$ or $\Delta h_c$)=|hue angle ($h_a$) after the test−hue angle ($h_b$) before the test|           Equation (3):

In regard to yellow:

A: value of hue angle change ($\Delta h_y$) is not more than 2°.

B: value of hue angle change ($\Delta h_y$) is more than 2° and not more than 3°.

C: value of hue angle change ($\Delta h_y$) is more than 3°.

In regard to magenta:

A: value of hue angle change ($\Delta h_m$) is not more than 1°.

B: value of hue angle change ($\Delta h_m$) is more than 1° and not more than 2°.

C: value of hue angle change ($\Delta h_m$) is more than 2°.

In regard to cyan:

A: value of hue angle change ($\Delta h_c$) is not more than 4°.

B: value of hue angle change ($\Delta h_c$) is more than 4° and not more than 6°.

C: value of hue angle change ($\Delta h_c$) is more than 6°.

TABLE 1

|  |  |  | Yellow ink | | | | | | |
|---|---|---|---|---|---|---|---|---|---|
|  |  |  | Y-1 | Y-2 | Y-3 | Y-4 | Y-5 | Y-6 | Y-7 |
| Ink composition (wt %) | Dye (a) | C.I. Direct Yellow 132 | 3.0 | 2.55 | 2.1 | 1.8 | 1.7 | 3.4 | — |
|  | Dye (b) | C.I. Direct Yellow 142 | — | 0.45 | 0.9 | 1.2 | 0.3 | 0.6 | 3.0 |
|  | Glycerin |  | 27.0 | 27.0 | 27.0 | 27.0 | 27.0 | 27.0 | 27.0 |

TABLE 1-continued

|  |  | Yellow ink |  |  |  |  |  |  |
|---|---|---|---|---|---|---|---|---|
|  |  | Y-1 | Y-2 | Y-3 | Y-4 | Y-5 | Y-6 | Y-7 |
| Ink | Dipropylene glycol-n-propyl ether | 2.0 | 2.0 | 2.0 | 2.0 | 2.0 | 2.0 | 2.0 |
|  | Water | Balance | Balance | Balance | Balance | Balance | Balance | Balance |
|  | Ratio by weight of dye (dye (a):dye (b)) | — | 85:15 | 70:30 | 60:40 | 85:15 | 85:15 | — |
| Evaluation | Total amount of dye in ink (wt %) | 3.0 | 3.0 | 3.0 | 3.0 | 2.0 | 4.0 | 3.0 |
|  | Visual | A | A | A | A | A | A | C |
|  | Hue angle Before lightfastness test ($h_b$) [°] | 100 | 101 | 102 | 102 | 101 | 101 | 105 |
|  | After lightfastness test ($h_a$) [°] | 100 | 103 | 104 | 105 | 103 | 103 | 110 |
|  | Value of hue angle change [°] | 0 | 2 | 2 | 3 | 2 | 2 | 5 |
|  | Rank ($\Delta h_y$) | A | A | A | B | A | A | C |

TABLE 2

|  |  |  | Magenta ink |  |  |  |  |  |  |
|---|---|---|---|---|---|---|---|---|---|
|  |  |  | M-1 | M-2 | M-3 | M-4 | M-5 | M-6 | M-7 |
| Ink composition (wt %) | Dye (1) | Dye (1-A) | 3.0 | — | — | — | — | — | — |
|  |  | Dye (1-B) | — | — | — | — | 1.7 | — | — |
|  |  | Dye (1-C) | — | 2.55 | — | — | — | — | — |
|  |  | Dye (1-D) | — | — | — | 1.8 | — | — | — |
|  |  | Dye (1-E) | — | — | 2.1 | — | — | 3.4 | — |
|  | Dye (c) | C.I. Acid Red 52 | — | 0.45 | 0.9 | 1.2 | 0.3 | 0.6 | 1.5 |
|  |  | C.I. Direct Red 289 | — | — | — | — | — | — | 1.5 |
|  | Glycerin |  | 27.0 | 27.0 | 27.0 | 27.0 | 27.0 | 27.0 | 27.0 |
|  | Dipropylene glycol-n-propyl ether |  | 2.0 | 2.0 | 2.0 | 2.0 | 2.0 | 2.0 | 2.0 |
|  | Water |  | Balance | Balance | Balance | Balance | Balance | Balance | Balance |
| Ink | Ratio by weight of dye (dye (1):dye (c)) |  | — | 85:15 | 70:30 | 60:40 | 85:15 | 85:15 | — |
| Evaluation | Total amount of dye in ink (wt %) |  | 3.0 | 3.0 | 3.0 | 3.0 | 2.0 | 4.0 | 3.0 |
|  | Visual |  | A | A | A | A | A | A | C |
|  | Hue angle Before lightfastness test ($h_b$) [°] |  | 347 | 346 | 346 | 346 | 347 | 348 | 328 |
|  | After lightfastness test ($h_a$) [°] |  | 348 | 347 | 347 | 348 | 348 | 349 | 338 |
|  | Value of hue angle change [°] |  | 1 | 1 | 1 | 2 | 1 | 1 | 10 |
|  | Rank ($\Delta h_m$) |  | A | A | A | B | A | A | C |

TABLE 3

|  |  |  | Cyan ink |  |  |  |  |  |  |
|---|---|---|---|---|---|---|---|---|---|
|  |  |  | C-1 | C-2 | C-3 | C-4 | C-5 | C-6 | C-7 |
| Ink composition (wt %) | Dye (2) | Dye (2-A) | — | 3.4 | — | — | — | 4.25 | — |
|  |  | Dye (2-B) | — | — | 2.8 | — | — | — | — |
|  |  | Dye (2-C) | 4.0 | — | — | — | — | — | — |
|  |  | Dye (2-D) | — | — | — | — | 2.55 | — | — |
|  |  | Dye (2-E) | — | — | — | 2.4 | — | — | — |
|  | Dye (d) | C.I. Direct Blue 199 | — | 0.6 | 1.2 | 1.6 | 0.45 | 0.75 | 4.0 |
|  | Glycerin |  | 27.0 | 27.0 | 27.0 | 27.0 | 27.0 | 27.0 | 27.0 |
|  | Dipropylene glycol-n-propyl ether |  | 2.0 | 2.0 | 2.0 | 2.0 | 2.0 | 2.0 | 2.0 |
|  | Water |  | Balance | Balance | Balance | Balance | Balance | Balance | Balance |
| Ink | Ratio by weight of Dye (dye (2):dye (d)) |  | — | 85:15 | 70:30 | 60:40 | 85:15 | 85:15 | — |
| Evaluation | Total amount of dye in ink (wt %) |  | 4.0 | 4.0 | 4.0 | 4.0 | 3.0 | 5.0 | 4.0 |
|  | Visual |  | A | A | A | A | A | A | C |
|  | Hue angle Before lightfastness test ($h_b$) [°] |  | 237 | 236 | 236 | 236 | 236 | 236 | 236 |
|  | After Lightfastness test ($h_a$) [°] |  | 233 | 232 | 232 | 231 | 232 | 232 | 227 |
|  | Value of hue angle change [°] |  | 4 | 4 | 4 | 5 | 4 | 4 | 9 |
|  | Rank ($\Delta h_c$) |  | A | A | A | B | A | A | C |

As is found from Table 1, yellow inks for ink-jet recording (Y-1) to (Y-6) each contain a yellow coloring agent, water and a water-soluble organic solvent, and contain C. I. Direct Yellow 132 as the yellow coloring agent; an total amount of the yellow coloring agent is in the range from 1 to 4 wt %; and a value of hue angle change ($\Delta h_y$), between before and after the lightfastness tests, of print region corresponding to the yellow ink formed on glossy paper is not more than 3°. The change of yellow color was not visually recognized. The yellow inks (Y-1) to (Y-3), (Y-5) and (Y-6), which each contain C. I. Direct Yellow 132 in an amount of at least 70 wt % based on the total weight of the yellow coloring agent, each had a small value of hue angle change ($\Delta h_y$) compared with the yellow ink (Y-4) and were favorable and excellent. On the other hand, in the yellow ink for ink-jet recording (Y-7), since the value of hue angle change ($\Delta h_y$) was 5° between before and after the lightfastness tests, the yellow color was changed to such an extent as was able to be visually recognized.

As is found from Table 2, magenta inks for ink-jet recording (M-1) to (M-6) each contain a magenta coloring agent, water and a water-soluble organic solvent, and contain a magenta dye represented by the general formula (1) as the magenta coloring agent; an total amount of the magenta coloring agent is in the range from 1 to 4 wt %; and a value of hue angle change ($\Delta h_m$), between before and after the lightfastness tests, of print region corresponding to the magenta ink formed on glossy paper is not more than 2°. The change of magenta color was not visually recognized. The magenta inks (M-1) to (M-3), (M-5) and (M-6), which each contain the magenta dye represented by the general formula (1) in an amount of at least 70 wt % based on the total weight of the magenta coloring agent, each had a small value of hue angle change ($\Delta h_m$) compared with the magenta ink (M-4) and were favorable. On the other hand, in the magenta ink for ink-jet recording (M-7), since the value of hue angle change ($\Delta h_m$) was 10° between before and after the lightfastness tests, the magenta color was changed to such an extent as was able to be visually recognized.

As is found from Table 3, cyan inks for ink-jet recording (C-1) to (C-6) each contain a cyan coloring agent, water and a water-soluble organic solvent, and contain a cyan dye represented by the general formula (2) as the cyan coloring agent; the total amount of, the cyan coloring agent is in the range from 1 to 5 wt %; and a value of hue angle change ($\Delta h_c$), between before and after the lightfastness tests, of print region corresponding to the cyan ink formed on glossy paper is not more than 6°. The change of cyan color was not visually recognized. The cyan inks (C-1) to (C-3), (C-5) and (C-6), which each contain the cyan dye represented by the general formula (2) in an amount of at least 70 wt % based on the total weight of the cyan coloring agent, each had a small value of hue angle change ($\Delta h_c$) compared with the cyan ink (C-4) and were favorable. On the other hand, in the cyan ink for ink-jet recording (C-7), since the value of hue angle change ($\Delta h_c$) was 9° between before and after the lightfastness tests, the cyan color was changed to such an extent as was able to be visually recognized.

3) Configuration of Ink Set

As is shown in Tables 4 and 5, the yellow ink, the magenta ink and the cyan ink are combined with one another, to thereby configure the ink set for ink-jet recording according to aspects of the invention.

4) Evaluation of Ink Set

Inks for ink-jet recording were filled in desired ink cartridges, and then the resultant ink cartridges were attached to a digital multifunction device equipped with an ink-jet printer DCP-110C (available from Brother Industries, Ltd.). Subsequently, the resultant digital multifunction device printed JIS SCID No. 2 as a natural image sample and a flesh-color solid-print image sample as a flesh-color image sample on glossy paper. The flesh color used in the evaluation test was in the range of $45 \leq L^* \leq 55$, $15 \leq C^* \leq 25$, and $15 \leq h^* \leq 30$. Further, the glossy paper employed was KASSAI® Fuji Film glossy paper of high quality (available from Fuji Photo Film Co., Ltd.).

The thus-obtained natural image sample and the flesh-color image sample were subjected to a lightfastness test. The lightfastness test was performed by using a high-energy xenon weather-meter SC750-WN (manufactured by Suga Test Instruments Co., Ltd.) such that light radiated from a xenon lamp is irradiated on each sample for 100 hours at a room temperature of 25° C., a humidity of 50% RH with an irradiation intensity of 93 klux.

Hereinafter, lightfastness evaluations of the ink sets for ink-jet recording are described in detail.

(c) Visual Evaluation of Natural Image Sample

The natural image sample subjected to the lightfastness test was visually evaluated in accordance with evaluation criteria described below. The obtained evaluation results are shown in Tables 4 and 5.

A: it was not recognized that the image color has been changed.

C: it was recognized that the image color has been changed.

(d) Visual Evaluation of Flesh-Color Image Sample

The flesh-color image sample subjected to the lightfastness test was visually evaluated in accordance with evaluation criteria described below. The obtained evaluation results are shown in Tables 4 and 5.

A: it was not recognized that the image color has been changed.

C: it was recognized that the image color has been changed.

(e) Value of Hue Angle Change of Flesh-Color Image Sample

In regard to the flesh-color image sample of each ink set for ink-jet recording, 5 points each of the hue angle ($h_b$) before the lightfastness test and the hue angle ($h_a$) after the lightfastness test were measured. By using an average number of each of these 5-point measurements of the hue angles ($h_b$) and the hue angles ($h_a$), a value of hue angle change ($\Delta h_f$) between before and after the tests was obtained in accordance with the equation (4) to be described below and the resultant values were evaluated in accordance with evaluation criteria as described below. The obtained results are shown in Tables 4 and 5. Firstly, L*, a* and b* were measured by using Spectrolino (manufactured by Gretag Macbeth; light source: $D_{65}$; field of view: 2°; status: A), and then the hue angle (h) was computed from these measurements in accordance with the equation (2).

Value of hue angle change ($\Delta h_f$)=|hue angle ($h_a$) after the test−hue angle ($h_b$) before the test|  Equation (4):

A: value of hue angle change ($\Delta h_f$) is not more than 7°.

B: value of hue angle change ($\Delta h_f$) is more than 7° and not more than 10°.

C: value of hue angle change ($\Delta h_f$) is more than 100.

(f) Overall Evaluation

In regard to each ink set for ink-jet recording, from the obtained results of (c) visual evaluation of natural image sample, (d) visual evaluation of flesh-color image sample and (e) value of hue angle change of flesh-color image sample, an overall evaluation was performed in accordance with the criteria as described below. The obtained results are shown in Tables 4 and 5.

G: all of evaluation results were ranked as A or B.

NG: at least one of evaluation results was ranked as C.

TABLE 4

|  |  |  | Example 1 | | | Example 2 | | | Example 3 | | | Example 4 | | |
| --- | --- | --- | --- | --- | --- | --- | --- | --- | --- | --- | --- | --- | --- | --- |
| Ink set configuration (yellow ink, magenta ink, cyan ink) | | | Y-1 | M-1 | C-1 | Y-2 | M-2 | C-2 | Y-3 | M-3 | C-3 | Y-4 | M-4 | C-4 |
| Ink set | Each color patch | Value of hue angle change ($\Delta h_y$, $\Delta h_m$, $\Delta h_c$) | 0 | 1 | 4 | 2 | 1 | 4 | 2 | 1 | 4 | 3 | 2 | 5 |
|  | Natural image sample | Visual evaluation | | A | | | A | | | A | | | A | |
|  | Flesh-color image sample | Visual evaluation | | A | | | A | | | A | | | A | |
|  |  | Hue angle before lightfastness test ($h_b$) | | 52 | | | 51 | | | 49 | | | 50 | |
|  |  | Hue angle after lightfastness test ($h_a$) | | 46 | | | 44 | | | 42 | | | 41 | |
|  |  | Value of hue angle change ($\Delta h_f$) [°] | | 6 | | | 7 | | | 7 | | | 9 | |
|  |  | Rank | | A | | | A | | | A | | | B | |
|  | Overall evaluation | | | G | | | G | | | G | | | G | |

|  |  |  | Example 5 | | | Example 6 | | | Example 7 | | |
| --- | --- | --- | --- | --- | --- | --- | --- | --- | --- | --- | --- |
| Ink set configuration (yellow ink, magenta ink, cyan ink) | | | Y-5 | M-5 | C-5 | Y-6 | M-6 | C-6 | Y-1 | M-2 | C-3 |
| Ink set | Each color patch | Value of hue angle change ($\Delta h_y$, $\Delta h_m$, $\Delta h_c$) | 2 | 1 | 4 | 2 | 1 | 4 | 0 | 1 | 4 |
|  | Natural image sample | Visual evaluation | | A | | | A | | | A | |
|  | Flesh-color image sample | Visual evaluation | | A | | | A | | | A | |
|  |  | Hue angle before lightfastness test ($h_b$) | | 51 | | | 48 | | | 50 | |
|  |  | Hue angle after lightfastness test ($h_a$) | | 44 | | | 41 | | | 45 | |
|  |  | Value of hue angle change ($\Delta h_f$) [°] | | 7 | | | 7 | | | 5 | |
|  |  | Rank | | A | | | A | | | A | |
|  | Overall evaluation | | | G | | | G | | | G | |

TABLE 5

|  |  |  | Comparative Example 1 | | | Comparative Example 2 | | | Comparative Example 3 | | | Comparative Example 4 | | |
| --- | --- | --- | --- | --- | --- | --- | --- | --- | --- | --- | --- | --- | --- | --- |
| Ink set configuration (yellow ink, magenta ink, cyan ink) | | | Y-7 | M-7 | C-7 | Y-7 | M-1 | C-1 | Y-1 | M-7 | C-1 | Y-1 | M-1 | C-7 |
| Ink set | Each color patch | Value of hue angle change ($\Delta h_y$, $\Delta h_m$, $\Delta h_c$) | 5 | 10 | 9 | 5 | 1 | 4 | 0 | 10 | 4 | 0 | 1 | 9 |
|  | Natural image sample | Visual evaluation | | C | | | C | | | C | | | C | |
|  | Flesh-color image sample | Visual evaluation | | C | | | C | | | C | | | B | |
|  |  | Hue angle before lightfastness test ($h_b$) | | 48 | | | 52 | | | 50 | | | 49 | |
|  |  | Hue angle after lightfastness test ($h_a$) | | 65 | | | 40 | | | 69 | | | 43 | |
|  |  | Value of hue angle change ($\Delta h_f$) [°] | | 17 | | | 12 | | | 19 | | | 6 | |
|  |  | Rank | | C | | | C | | | C | | | A | |
|  | Overall evaluation | | | NG | | | NG | | | NG | | | NG | |

As is found from Table 4, in a case of ink sets of Examples 1 to 7, in regard to the natural image sample and the flesh-color image sample, it was not recognized that colors of the images have been changed between before and after the lightfastness tests. Further, the value of hue angle change ($\Delta h_f$) of the flesh color was 6° in a case of the ink set in Example 1, 7° in a case of ink sets of Examples 2, 3, 5 and 6, 9° in a case of the ink set of Example 4, and 5° in a case of the ink set of Example 7. They were all favorable and the overall evaluations were also favorable.

On the other hand, as is found from Table 5, in a case of ink sets of Comparative Examples 1 to 4, in regard to the natural image sample and the flesh-color image sample, it was recognized that colors of the images have been changed. Further, the value of hue angle change ($\Delta h_f$) of the flesh color image sample was 6° in a case of the ink set in Comparative Example 4, 17° in a case of the ink set of Comparative Example 1, 12° in a case of the ink set of Comparative Example 2, and 19° in a case of the ink set of Comparative Example 3. Results of the latter 3 ink sets were not favorable. In the overall evaluations, results of any one of the ink sets in Comparative Examples were unfavorable.

The invention is not limited to the aspects described in the Examples, which are provided for illustrative purposes only. It will be apparent that various modifications can be made without departing from the spirit and the scope of the invention as described and claimed herein.

What is claimed is:

1. An ink set for ink-jet recording, comprising a yellow ink, a magenta ink and a cyan ink,
    wherein values of hue angle change ($\Delta h$), between before and after lightfastness tests, of print regions corresponding to respective inks formed on glossy paper by using the yellow ink, the magenta ink and the cyan ink are not more than about 3° for the yellow ink, not more than about 2° for the magenta ink, and not more than about 6° for the cyan ink.

2. The ink set for ink jet recording according to claim 1, wherein the yellow ink comprises a yellow coloring agent, water and a water-soluble organic solvent, and further comprises C. I. Direct Yellow 132.

3. The ink set for ink-jet recording according to claim 2, wherein an amount ratio of C. I. Direct Yellow 132 is at least about 70 wt % based on the total weight of the yellow coloring agent.

4. The ink set for ink-jet recording according to claim 2, wherein the total amount of the yellow coloring agent is in the range from about 1 wt % to about 4 wt % based on the total weight of the yellow ink.

5. The ink set for ink-jet recording according to claim 1, wherein the magenta ink comprises a magenta coloring agent, water and a water-soluble organic solvent, and further comprises a magenta dye represented by the following general formula (1):

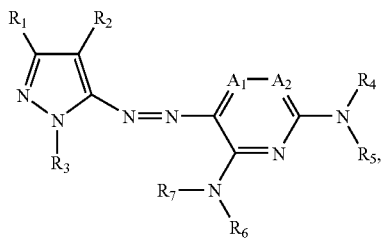

(1)

wherein $R_1$ represents a hydrogen atom, an optionally substituted alkyl group or an optionally substituted aryl group;

$R_2$ represents a hydrogen atom, a halogen atom or a cyano group;

$R_3$ represents a hydrogen atom, an optionally substituted alkyl group, an optionally substituted aryl group or an optionally substituted heterocyclic group;

$R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group, where $R_4$ and $R_5$ do not simultaneously represent a hydrogen atom, and $R_6$ and $R_7$ do not simultaneously represent a hydrogen atom; and $A_1$ and $A_2$ either simultaneously represent an optionally substituted carbon atom, or differently represent an optionally substituted carbon atom or a nitrogen atom from each other.

6. The ink set for ink-jet recording according to claim 5, wherein an amount ratio of the magenta dye represented by the general formula (1) is at least about 70 wt % based on the total weight of the magenta coloring agent.

7. The ink set for ink jet recording according to claim 5, wherein a total amount of the magenta coloring agent is in the range from about 1 wt % to about 4 wt % based on the total weight of the magenta ink.

8. The ink set for ink-jet recording according to claim 1; wherein the cyan ink comprises a cyan coloring agent, water and a water-soluble organic solvent, and further comprises a cyan dye represented by the following general formula (2):

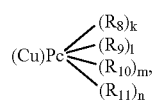

(2)

wherein Pc(Cu) represents a copper phthalocyanine nucleus represented by the following general formula (3):

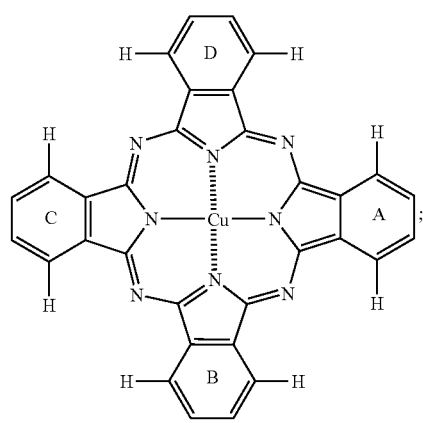

(3)

$R_8$, $R_9$, $R_{10}$ and $R_{11}$ each independently represent a substituent selected from the group consisting of $-SO_2-R_a$, $-SO_2NR_bR_a$ and $-CO_2-R_a$, where $R_8$, $R_9$, $R_{10}$ and $R_{11}$ do not simultaneously represent a same substituent, at least one of $R_8$, $R_9$, $R_{10}$ and $R_{11}$ comprises an ionic hydrophilic group as a substituent, and at least one of $R_8$, $R_9$, $R_{10}$ and $R_{11}$ is present in each of four benzene rings A, B, C and D of a copper phthalocyanine nucleus represented by the general formula (3);

$R_a$ represents a substituted or unsubstituted alkyl group;

$R_b$ represents a hydrogen atom or a substituted or unsubstituted alkyl group;

$R_c$ represents a substituted or unsubstituted alkyl group;

k represents a number which satisfies an inequality of $0 < k < 8$;

l represents a number which satisfies an inequality of $0 < l < 8$;

m represents a number which satisfies an inequality of $1 \leq m < 8$;

n represents a number which satisfies an inequality of $0 \leq n < 8$, where k, l, m and n each independently represent a number which satisfies an inequality of $4 \leq k+l+m+n8$.

9. The ink set for ink-jet recording according to claim 8, wherein an amount ratio of the cyan dye represented by the general formula (2) is at least about 70 wt % based on the total weight of the cyan coloring agent.

10. The ink set for ink-jet recording according to claim 8, wherein a total amount of the cyan coloring agent is in the range from about 1 wt % to about 5 wt % based on the total weight of the cyan ink.

11. The ink set for ink-jet recording according to claim 1, further comprising a black ink.

12. A yellow ink for ink-jet recording, comprising a yellow coloring agent, water and a water-soluble organic solvent, and further comprising C. I. Direct Yellow 132 in an amount of at least about 70 wt % based on the total weight of the yellow coloring agent, wherein a total amount of the yellow coloring agent is in the range from about 1 wt % to about 4 wt % based on the total weight of the yellow ink; and a value of hue angle change (Δh), between before and after lightfastness tests, of a print region corresponding to the yellow ink formed on glossy paper is not more than about 3°.

13. A magenta ink for ink-jet recording, comprising a magenta coloring agent, water and a water-soluble organic solvent, and further comprising a magenta dye represented by the following general formula (1) in an amount of at least about 70 wt % based on the total weight of the magenta coloring agent:

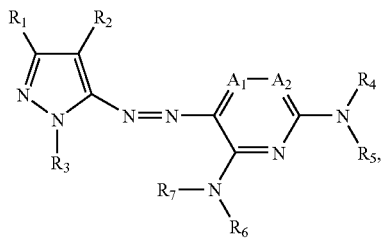

(1)

wherein $R_1$ represents a hydrogen atom, an optionally substituted alkyl group or an optionally substituted aryl group;

$R_2$ represents a hydrogen atom, a halogen atom or a cyano group;

$R_3$ represents a hydrogen atom, an optionally substituted alkyl group, an optionally substituted aryl group or an optionally substituted heterocyclic group;

$R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group, where $R_4$ and $R_5$ do not simultaneously represent a hydrogen atom, $R_6$ and $R_7$ do not simultaneously represent a hydrogen atom; and $A_1$ and $A_2$ either simultaneously represent an optionally substituted carbon atom, or differently represent an optionally substituted carbon atom or a nitrogen atom from other, wherein the total amount of the magenta coloring agent is in the range from about 1 wt % to about 4 wt % based on the total weight of the magenta ink; and a value of hue angle change (Δh), between before and after the lightfastness tests, of a print region corresponding to the magenta ink formed on glossary paper is not more than about 2°.

14. A cyan ink for ink jet recording, comprising a cyan coloring agent, water and a water-soluble organic solvent, and further comprising a cyan dye represented by the following general formula (2) in an amount of at least about 70 wt % based on the total weight of the cyan coloring agent:

(2)

wherein Pc(Cu) represents a copper phthalocyanine nucleus represented by the following general formula (3):

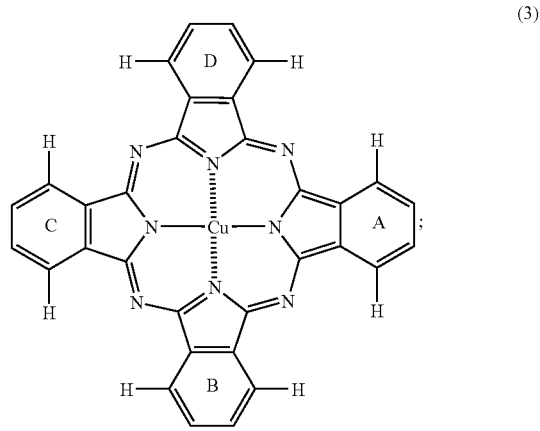

(3)

$R_8$, $R_9$, $R_{10}$ and $R_{11}$ each independently represent a substituent selected from the group consisting of $-SO_2-R_a$, $-SO_2NR_bR_c$ and $-CO_2-R_a$, where $R_8$, $R_9$, $R_{10}$ and $R_{11}$ do not simultaneously represent a same substituent, at least one of $R_8$, $R_9$, $R_{10}$ and $R_{11}$ comprises an ionic hydrophilic group as a substituent, and at least one of $R_8$, $R_9$, $R_{10}$ and $R_{11}$ is present in each of four benzene rings A, B, C and D of a copper phthalocyanine nucleus represented by the general formula (3);

$R_a$ represents a substituted or unsubstituted alkyl group;

$R_b$ represents a hydrogen atom or a substituted or unsubstituted alkyl group;

$R_c$ represents a substituted or unsubstituted alkyl group;

k represents a number which satisfies an inequality of $0 < k < 8$;

l represents a number which satisfies an inequality of $0 < l < 8$;

m represents a number which satisfies an inequality of $0 \leq m < 8$;

n represents a number which satisfies an inequality of $0 \leq n < 8$, where k, l, m and n each independently represent a number which satisfies an inequality of $4 \leq k+l+m+n8$, wherein a total amount of the cyan coloring agent is in the range from about 1 wt % to about 5 wt % based on the total weight of the cyan ink; and a value of hue angle change ($\Delta h$), between before and after the lightfastness tests, of a print region corresponding to the cyan ink formed on glossary paper is not more than about 6°.

15. A method for forming an image by applying an ink on glossy paper by using the ink set for ink-jet recording according to claim 1 with an ink-jet recording method, comprising forming print regions corresponding to respective inks on glossy paper by utilizing the yellow ink, the magenta ink and the cyan ink, such that values of hue angle change ($\Delta h$), between before and after lightfastness tests, of the print regions are allowed to be not more than about 3° with the yellow ink, not more than about 2° with the magenta ink and not more than about 6° with the cyan ink.

16. The method for forming the image according to claim 15, further comprising forming a print region of flesh color on glossy paper by using the yellow ink, the magenta ink and the cyan ink, a value of hue angle change ($\Delta h$), between before and after the lightfastness tests, of the print region of the flesh color is not more than about 10°.

17. The method for forming the image according to claim 15, comprising applying the ink on the glossy paper such that the total amount of the ink to be applied is in the range from about 1 $\mu g/in^2$ to about 30 $\mu g/in^2$ in terms of 100% duty.

* * * * *

UNITED STATES PATENT AND TRADEMARK OFFICE
CERTIFICATE OF CORRECTION

PATENT NO. : 7,736,425 B2
APPLICATION NO. : 11/704301
DATED : June 15, 2010
INVENTOR(S) : Ryuji Kato et al.

It is certified that error appears in the above-identified patent and that said Letters Patent is hereby corrected as shown below:

Column 27, Claim 8, Line 2:
Please delete "$1 \leq m < 8;$" and insert --$0 \leq m < 8;$--

Column 27, Claim 8, Line 6:
Please delete "m+n8," and insert --$m+n \leq 8$,--

Column 29, Claim 14, Line 4:
Please delete "m+n8," and insert --$m+n \leq 8$,--

Signed and Sealed this
Twenty-second Day of February, 2011

David J. Kappos
*Director of the United States Patent and Trademark Office*